United States Patent [19]
Kotterer et al.

[11] Patent Number: 5,958,136
[45] Date of Patent: Sep. 28, 1999

[54] DEVICE FOR POWDERING A PRODUCT

[75] Inventors: Werner J. Kotterer; Reinhold Senft, both of Diedorf, Germany

[73] Assignee: Grafotec Kotterer Dry Spray GmbH, Diedorf, Germany

[21] Appl. No.: 08/859,082

[22] Filed: May 20, 1997

[30] Foreign Application Priority Data

Jun. 7, 1996 [DE] Germany .................. 196 22 923

[51] Int. Cl.⁶ .................. B05B 7/00; G01F 11/06
[52] U.S. Cl. .................. 118/308; 222/342; 222/406; 222/410
[58] Field of Search .................. 222/342, 406, 222/410; 239/668, 669, 681; 118/308, 300; 198/540, 562

[56] References Cited

U.S. PATENT DOCUMENTS

| | | |
|---|---|---|
| 351,483 | 10/1886 | Baldwin .................. 222/342 |
| 3,461,032 | 8/1969 | Lichtenberger et al. .................. 118/308 |
| 3,606,099 | 9/1971 | Benson .................. 222/342 |

*Primary Examiner*—David A. Simmons
*Assistant Examiner*—Calvin Padgett
*Attorney, Agent, or Firm*—Jones, Tullar & Cooper, P.C.

[57] ABSTRACT

A device for powdering a product arranged on a transport, in particular for powdering new strip-shaped or plate-shaped glass by means of at least one application beam overhanging the transport, the application beam having a storage space supplied with a discharge slot on its bottom along the entire length of the beam and a feed device assigned to it, containing at least one driven roller. Loss of powder can be avoided and a clean operation can be achieved; by supplying several cover hoods near at least one lateral end of the roller, arranged next to each other, each being assigned to a narrow zone of the roller which cover hoods can alternatively be brought in cover position in which the circumference of the roller assigned to the discharge slot is covered.

16 Claims, 3 Drawing Sheets

DEVICE FOR POWDERING A PRODUCT

FIELD OF THE INVENTION

The present invention relates to a device for powdering a product arranged on a transport means, in particular for powdering strip-shaped or plate-shaped glass during production, by means of at least one application beam overhanging the transport means, the application beam having a storage space supplied with a discharge slot on its bottom along the entire length of the beam and a feed device assigned to it, containing at least one driven roller.

BACKGROUND OF THE INVENTION

Usually, in glass production the glass is powdered before it is stapled to avoid scratches etc. In known powdering devices of the kind mentioned experience has shown that a lot of powder is scattered around instead on the product resulting not only in the soiling of the vicinity and thus leading to an increased risk of accidents as well as to high maintenance costs but also causes a comparatively high powder consumption. The reason this happens is that in known approaches the powder is not discharged in relation to the format but along the entire length of the application beam whose length must correspond to the maximum format width plus a possible side drift.

Attempts to counteract this effect have tried, for example, by inserting fill wedges into the storage space which partly close the discharge slot. These fill wedges, however, have to be inserted manually which is often omitted. Further, the storage space needs to be emptied which is also undesirable. Apart from that, the fill wedges ensure only a rough adjustment of the length of the discharge slot to the format width and a side drift cannot be taken into account at all.

SUMMARY OF THE INVENTION

It is therefore an object of the present invention to provide an improved powdering device in a simple and cost saving way to the effect that the soiling of the vicinity by powder and the loss of powder is prevented to the greatest possible extent.

According to the present invention, in a device of the type as desribed above, there are supplied several cover hoods near at least one lateral end of the roller, arranged next to each other, each being assigned to a narrow zone of the roller which can alternatively be brought in cover position in which the circumference of the roller assigned to the discharge slot is covered.

It is thus possible to activate or passivate the filling of the discharge slot with powder by moving the cover hood zone by zone. The cover hoods can preferably be moved during operation and with full storage space in an easy and fast way. It is thus possible to control the actuating means assigned to the cover hoods in relation to the side position of the products, controlled by a sensor, ensuring a current, automatic adjustment of the active length of the roller that acts as an application roller.

Since the cover hoods have to be moved between only two end positions, the construction is very simple. According to the present invention it is ensured that only those products which are powdered move underneath the application beam and that no powder is wasted. It is herewith ensured that the vicinity will not be soiled, thus avoiding the risk of accidents and eliminating any cleaning; furthermore, the function of aggregates in the vicinity will not be affected. In addition, the powder consumption is kept low.

The cover hoods may preferably be formed as ring segments which are in concentric position to the circumference of the roller, and which can be shifted outward from the wall section of the storage space partly overhanging the roller, each one of said ring segments being on a sleigh which is in concentric position to the circumference of the roller. Thus, an exact operation and very short response times can be achieved.

In another preferred approach the cover hoods are grouped together on a carrier containing the guide and actuating means, which carrier can be inserted into an insertion chamber of the application beam supplied underneath a wall section of the storage space, which wall section overhangs the roller. This enables a simple preassembly of each one of a whole group of cover hoods and facilitates the maintenance of the whole group.

In an advantageous approach, the roller for forming the discharge slot acts in combination with a brush which is attached to the opposite wall of the feed chute towards which move the cover hoods. As a result, the discharge slot is reliably closed with the cover hoods being in cover position. Due to the high elasticity of the brushes the protection of the roller surface is assured.

Another advantageous measure can be the frame at the bottom rim of the application beam, which rim is limited by brushes. This ensures in an advantageous way a certain canalization of the powder discharged and prevents it from being blown off due to air drafts.

BRIEF DESCRIPTION OF THE DRAWINGS

Reference is made to the accompanying drawings, wherein.

DESCRIPTION OF THE PREFERRED EMBODIMENT

The powdering device according to the drawings can for example be integrated into a production lane for producing glass plates. It has been a well-known procedure to powder glass plates on one side to avoid scratches before they are stapled.

Figure 1:
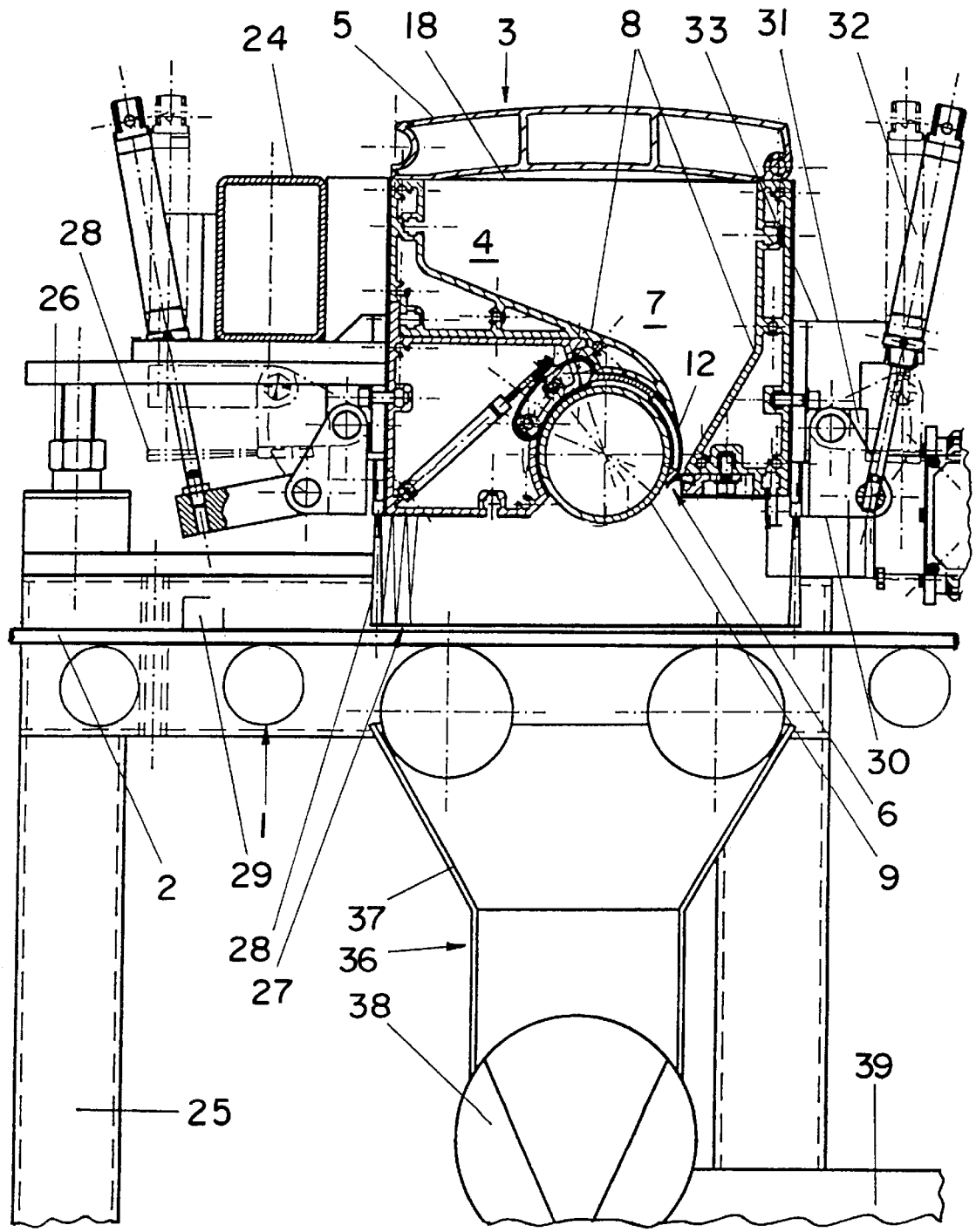
FIG. 1 is a side view partly in section of a device for powdering according to the present invention.
Figure 2:
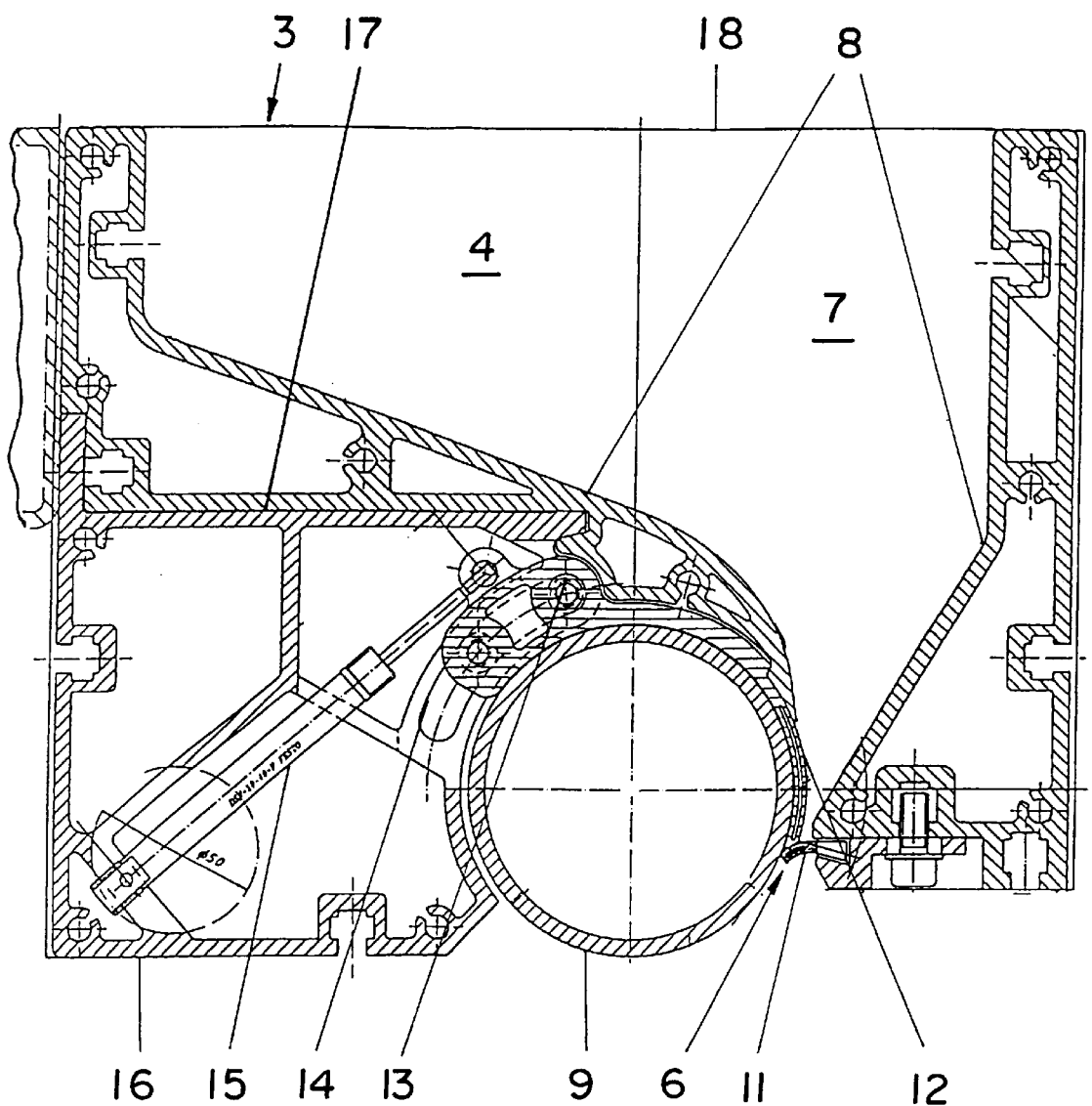
FIG. 2 is a section through the application beam of the powdering device according to the present invention in enlarged size compared to FIG. 1.

FIG. 1 illustrates a transport means 1 which is made up of rollers to transport consecutive glass plates 2 with or without distance. For the powdering of the glass plates 2 an application beam 3 spanning the width of the transport means 1 is supplied and overhanging the transport means 1 at a distance. As shown in FIGS. 1 and 2 the application beam 3 contains along its entire length a storage space 4 to be filled with powder and which can be covered by a swinging cap 5, and a discharge slot 6, along its entire length, through which powder is let out from the storage space 4 and is discharged on the glass plate 2 passing through underneath the application beam 3.

The discharge slot 6 is supplied at the bottom end of a feed chute 7 which has a funnel-shaped cross section. V-shaped wall sections 8, tilted against each other, are supplied for forming the feed chute 7 and forming the bottom of the storage space 4. On one side of the feed chute 7 the wall section 8 reaches as far as to the discharge slot 6. The opposite wall section 8 ends above the discharge slot 6 forming a distance between the two ends. The distance thus created is bridged by the circumference of the roller 9 which runs along the entire length of the application beam 3 whereby part of the wall section 8 extends over the roller 9 thus forming the bottom region near the discharge slot 6 of a lateral limitation of the feed chute 7.

Figure 3:
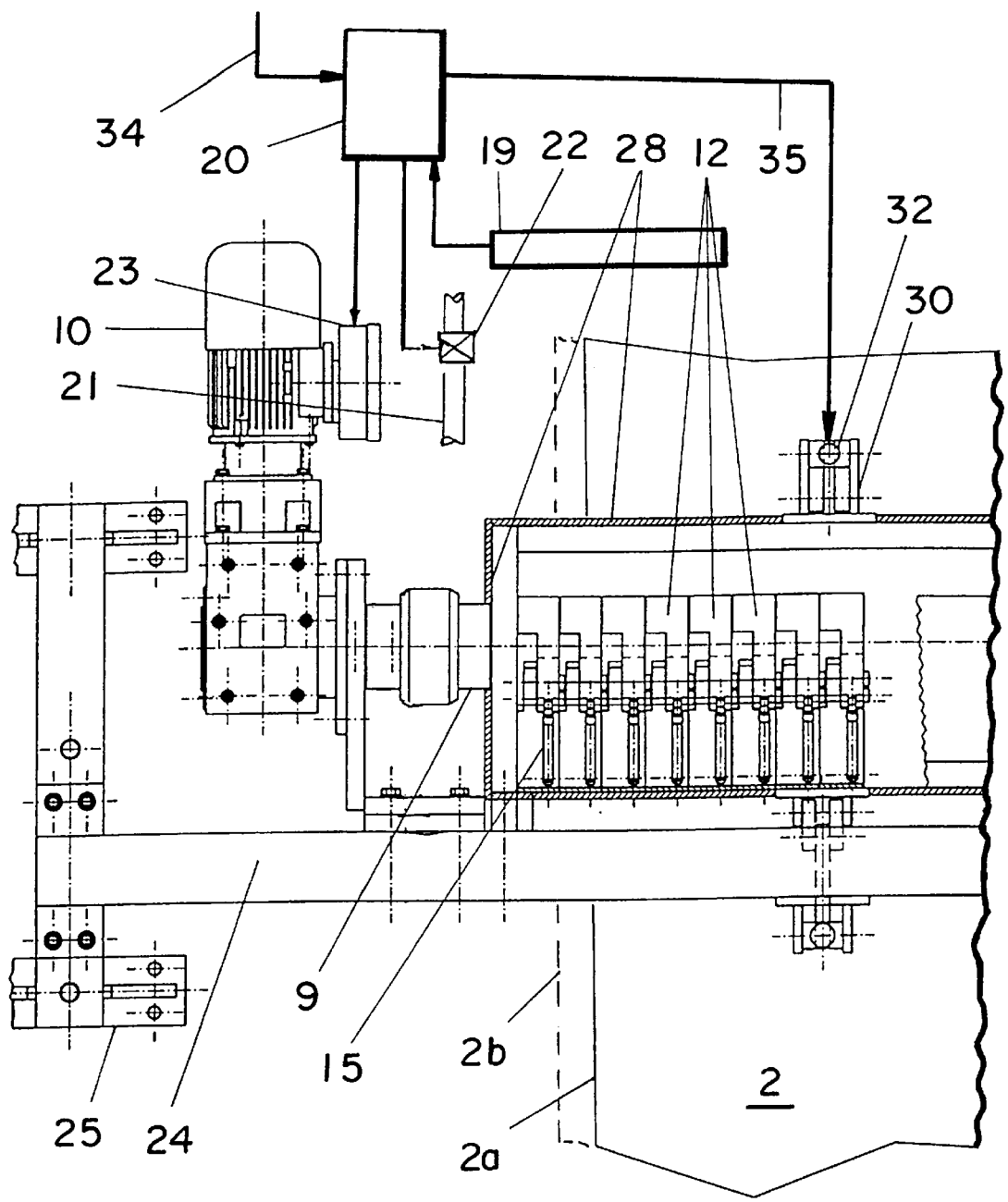
FIG. 3 is a schematic top plan view of the powdering device according to the present invention.

As shown in FIG. 3, the roller 9 is driven by a geared motor 10. The roller 9 acts as a discharge roller which carries powder from the storage space 4 and discharges it over the discharge slot 6. To form a very narrow cross section of the discharge slot 6, as shown in FIGS. 1 and 2, the limitation of the feed chute 7 opposite the roller 9 is supplied with a lip 11, preferably having the shape of a brush and acting in combination with the roller 9. The lip 11 acts as a means for wiping off and holding back by which the thickness of the powder layer on the roller 9 passing through the discharge slot 6 is determined. The flow rate per time unit can be controlled by adjusting the number of revolutions of the roller 9. The geared motor 10 is supplied correspondingly. To interrupt the powder application the roller 9 is stopped. The affinity of the roller 9 to the powder is determined by its surface roughness. Thus, the amount of powder to be transported by the roller 9 can be adjusted. Rolls with different kinds of surface roughness are used for different applications.

As shown in FIG. 3, the plates 2 can have a different width. The side edge 2a of a narrow plate is indicated by continuous lines, the side edge 2b of a wider plate is indicated by broken lines. If the plates 2 are passed along a guide with one side edge, the difference in width becomes noticeable only at the other side. If the plates 2 are transported in the middle of the transport means, 1 positions of the side edges at either side will be different, depending on the width of the plates. A sidewise drifting of the plates 2 can also occur.

To avoid scattering of powder outside of the lateral edges of the plates 2, cover hoods 12 are assigned to the roller 9 which extend in the longitudinal direction of the roller 9 over a narrow zone of the roller 9. It is contemplated to equip the whole length of the roller with the cover hoods 2, which would be arranged next to each other. However as a rule, it suffices to provide a group of cover hoods 12, arranged next to each other, near the end pieces assigned to the side ends of the roller 9. If the plates 2 are arranged with lateral guide, it is sufficient to assign cover hoods 12 to the end piece of the roller 9 at the remote side of the guide.

The cover hoods 12 can be advanced from a retracted position underneath the wall section 8 partly overhanging the roller 9 to a covering position as is shown in FIGS. 1 and 2 in which the circumference of the roller 9 exceeding the wall section 8 and forming the bottom part of the side wall of the feed chute 7 is covered. The covered circumference of the roller 9 cannot pick up nor discharge through the discharge slot 6 any powder. It is thus possible to close or release the powder discharge zone by zone. To ensure exact closing, the front edges of the cover hoods 12 touch the lip 11 in a cover position, as is illustrated in FIGS. 1 and 2.

As shown in FIGS. 1 and 2, the cover hoods 12 are formed as ring segments which are in concentrical position to the circumference of the roller 9 and can be shifted outward from the wall section 8 overhanging the roller 9. The ring segments with their rear ends are arranged on an assigned sleigh 13 which is movable on a stationary, bow shaped guide 14 which is also in concentrical position to the circumference of the roller 9. The guide 14 is formed by a rib on the side of the trestle, as shown in the example, which rib is supplied with a bow shaped slot. The slot is penetrated by guide pins protruding from the sleigh 13. The ends of the bow shape slot act as stops which determine the cover position and/or the retracted waiting position. The front stop is positioned in a useful way so that the front end of the assigned cover hood 12, as mentioned above, touches the lip 11 during the cover position.

An actuating means 15 is assigned to each unit consisting of a cover hood 12 with an assigned sleigh 13. Since each one of the mentioned units can be driven forward and backward until they touch the stop, the actuating means 15 can be formed as two point adjusting units, here in the form of a pneumatically or hydraulically driven adjusting cylinder. As shown in FIGS. 1 and 2, the cylinder is supported by the trestle on the one hand and connected with the assigned sleigh 13 on the other hand.

All cover hoods 12 assigned to a lateral end piece of the roller 9 as well as the assigned guide and actuating means are, as shown in FIGS. 1 and 2, arranged on a common carrier 16 which extends along the length of the assigned end piece, which carrier 16 is inserted into an assigned recess 17 of the application beam 3. The recess 17 is located underneath the wall section 8 which partly overhangs the roller 9. It would be useful if the recess 17 extends along the entire length of the application beam 3. If within the vicinity of both end pieces of the roller 9 a group of cover hoods 12 is supplied, each one of the carriers 16 assigned to such group can be inserted into the recess 17 acting as insertion chamber.

The carrier 16 can be a section of a drawn rail. Only the guides 14 require working. In the illustrated example the application beam 3 is based on a section of a drawn rail. To form a front end of the storage space 4 front plates 18 may be supplied on which the roller 9 is mounted and which limit the recess 17 along the front ends.

Pressurizing of the cylinders supplied as acuating means 15 can be carried out manually. The illustrated example shows an automatically working arrangement. As shown in FIG. 3, a sensor 19 is supplied which detects the position of the lateral edge 2a and/or 2b of a plate 2 passing through the device according to the present invention. The output signals of the sensor 19 are transformed into control signals in a subsequently arranged control device, e.g. a computer 20, for the valves 22 arranged in the energy supply lines 21 extending to the actuating means 15. By means of the sensor 19 and the computer 20 a control signal for the geared motor which is supplied to the gear box 23 of the geared motor 10 is generated which control signal depends on the transport speed of the plates 2 and which controls the number of revolutions of the roller 9 depending on the number of plates and accordingly the amount of powder. The sensor 19 also detects gaps between the consecutive plates 2. If a gap passes through underneath the discharge slot 6, the roller 9 will be stopped. The corresponding control signals may also be generated by the computer 20.

As shown in FIG. 1, the application beam 3 is mounted to a parallel traverse 24 each of whose ends lie on a bed 25 which is arranged near the transport means 1. The beds 25 are supplied with consoles assigned to the traverse 4 and adjustable in height by adjusting screws 26 so that the application beam 3 can be brought into the desired position in relation to the transport level of the transport means 1. At the bottom rim of the application beam 3 a framework 27 is supplied with a four flat brush attachment 28. Thus, a canal is formed canalizing the powder which falls on the plate 2 passing through and which prevents the powder from blowing off sideways due to air draft. The brush rails 28 are arranged such that their lower ends reach to the upper side of the plate 2 passing through, however, without touching it so that the powder will not be brushed off. For this purpose the entire application beam 3 is correspondingly adjusted by means of the adjusting screws 26. It is also contemplated to move the brush rail 28 which is assigned to the entry towards the surface of the plate in order to brush it off and to arrange the brush rail 28 at the exit such that it does not touch the plate.

The flat brushes 28 running parallel to the conveyor direction of the transport means 1 are arranged stationary and mounted to the front plates 18 of the application beam 3. The flat brushes 28 move around a horizontal axis and can be tilted; they can be moved up into a horizontal position, as shown in FIG. 1 left in broken lines. Thus, the application beam 3 can pass over a raised object 29 on the plate 2 passing through without contacting the flat brushes 28. It is further possible to knock the flat brushes 28 running parallel to the conveyor direction of the transport means 1 against the stop defining the upward position of the brushes.

The head rails of the swinging flat brushes 28 are supplied with tongues 30 which reach into assigned forks 31 attached to the application beam 3 and which are connected by corresponding pins. The swinging process is carried through by actuating means 32, here cylinder piston units, which seize the tongues 30 and which are supported by consoles 33 protruding from the application beam 3. The actuating means 32 supplied on the side assigned to the traverse 24 are arranged such and seize the tongues 33 such that collisions with the traverse 24 are avoided.

The actuating means 32 assigned to the flat brushes 28 can be activated manually, as indicated by a key board 34 of the computer 20. Automatic activation is also contemplated. The sensor 19 and the computer 20 can be supplied such that hindrances of the kind as indicated in 29 are recognized and the corresponding control signals for the valves 22, arranged in the energy supply lines extending to the actuating means 32, are generated as indicated in FIG. 3 by the signal line 35.

Underneath the transport level of the transport means 1, as shown in FIG. 1, a disposal means 36 is supplied which collects the powder falling through and disposes of it. The disposing means 36 is supplied with a collection funnel 37 underneath the brush frame 27; the upper rim of the funnel 37 projects over the inner rim of the brush frame 27. Reliable collection of the powder canalized by the brush frame 27 is thus ensured. In the illustrated example the front and rear walls of the collection funnel 27 run alongside with a pair of rollers of the transport means 1. The lower exit of the collection funnel 37 is connected with the suction neck of a ventilator 38 which is followed by a dust separator 39. Due to the vaccum generated by the ventilator 38 which becomes effective in the vicinity of the collection funnel 37 the powder is reliably sucked into the dust separator and is separated in the dust separator 39; the air emitted has a high purity level and the recycling of the powder becomes possible.

What is claimed is:

1. A device for powdering a product during production thereof, comprising:
    transport means for transporting the product to be powdered; and
    at least one application beam situated to overhang said transport means and through which powder is applied to the product, said at least one application beam including means defining a storage space along the entire length of said at least one application beam, a discharge slot located at the bottom of said storage space along the entire length of said at least one application, at least one driven roller associated with said discharge slot, said at least one driven roller defining lateral ends, and several cover hoods near at least one lateral end of said at least one driven roller, said cover hoods being arranged next to each other, each being associated with a given zone of said at least one driven roller, and being adaptable to cover a portion of the circumference of said at least one driven roller.

2. The device as defined in claim 1, wherein said at least one application beam further including guide means in concentric position relative to the circumference of said at least one driven roller, and a sleigh mounted on said guide means, and wherein said cover hoods comprise ring segments arranged concentric with the circumference of said at least one driven roller, which segments are mounted on a sleigh and adopted to be shifted outward from said means defining said storage space to partly overhang said at least one driven roller.

3. The device as defined in claim 2, wherein said at least one application beam further includes actuating means assigned to each sleigh, and wherein each sleigh is moved between two stop positions by its associated actuating means.

4. The device as defined in claim 3, wherein said actuating means comprises a piston cylinder.

5. The device as defined in claim 3, wherein said at least one application beam further includes a carrier containing said guide means and said actuating means, said cover means are grouped together on said carrier, and wherein said means defining a storage chamber includes an insertion chamber into which said carrier is inserted, said insertion chamber being situated beneath a wall section of said means defining a storage chamber, said wall section partly overhanging said at least one driven roller.

6. The device as defined in claim 5, wherein said at least one application beam, including said carrier are formed as a section of a pre-shaped rail.

7. The device as defined in claim 3, wherein the products have lateral edges of different widths, and wherein said actuating means is activated depending on the position of the lateral edges of the product passing through said at least one application means.

8. The device as defined in claim 1, wherein said at least one application beam further includes a lip attached to an opposite wall to said wall section, said cover hoods being movable toward said lip, and wherein said at least one driven roller partly defines said discharge slot, and said at least one driven roller acts in conjunction with said lip at said discharge slot.

9. The device as defined in claim 8, wherein said lip comprises a brush.

10. The device as defined in claim 1, further comprising:
    means for driving said at least one driven roller at changing speeds.

11. The device as defined in claim 1, wherein the height of said at least one application beam is adjustable relative to the transporting level of said transport means.

12. The device as defined in claim 1, wherein said at least one application beam further including a brush frame having flat brushes situated at the bottom end of said at least one application beam.

13. The device as defined in claim 12, wherein said flat brushes extend at right angles to the transport direction of said transport means, and wherein said flat brushes are movable upwardly.

14. The device as defined in claim 1, further comprising:
    disposal means situated beneath the transport level of said transport means, including a collection funnel.

15. The device as defined in claim 1, wherein said product comprises strip-shaped glass.

16. The device as defined in claim 1, wherein said product comprises plate-shaped glass.

* * * * *